United States Patent

[11] 3,607,864

| | | | |
|---|---|---|---|
| [72] | Inventor | Alfred Halpern | |
| | | Great Neck, N.Y. | |
| [21] | Appl. No. | 817,876 | |
| [22] | Filed | Apr. 21, 1969 | |
| [45] | Patented | Sept. 21, 1971 | |
| [73] | Assignee | Synergistics, Inc. | |
| | | New York, N.Y. | |

[54] PROCESS FOR PREPARING NEOMYCIN UNDECYLENATE
6 Claims, 2 Drawing Figs.

[52] U.S. Cl. ................................................... 260/210 NE
[51] Int. Cl. .................................................... C07c 129/18
[50] Field of Search ........................................ 260/210 NE

[56] References Cited
UNITED STATES PATENTS
3,022,286  2/1962  Van de Griendt ............ 260/210 NE

*Primary Examiner*—Lewis Gotts
*Assistant Examiner*—Johnnie R. Brown
*Attorney*—Stanley Wolder

ABSTRACT: The method for preparing neomycin undecylenate in pure form by reacting an acid salt of neomycin with an alkali metal or an ammonium salt of undecylenic acid in an inert saline medium containing not more than 10 percent of inorganic salt ions, so that the formed neomycin undecylenate may be readily separated, washed free of contaminants and dried.

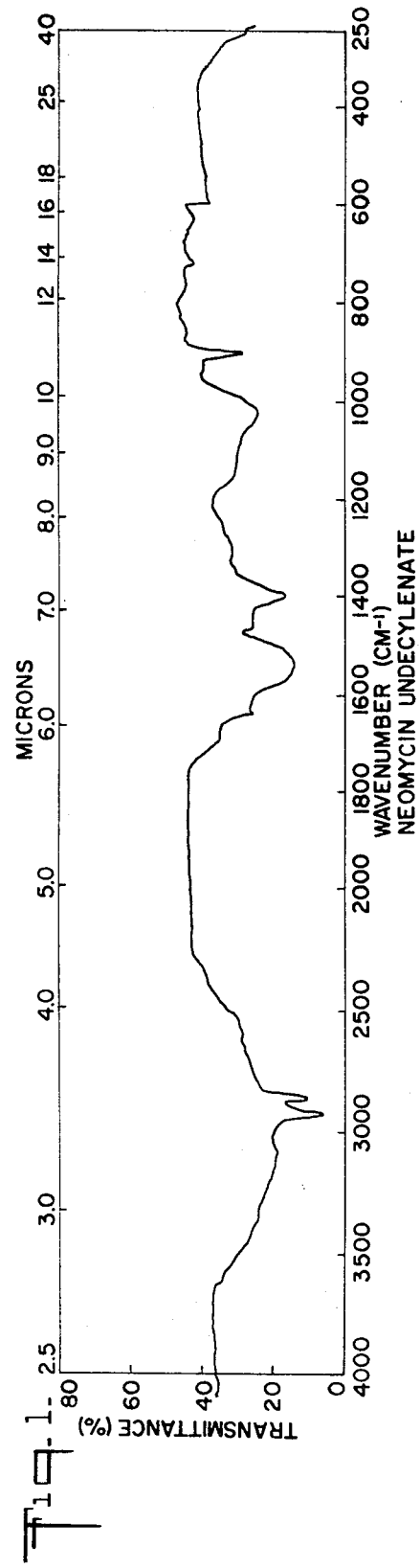
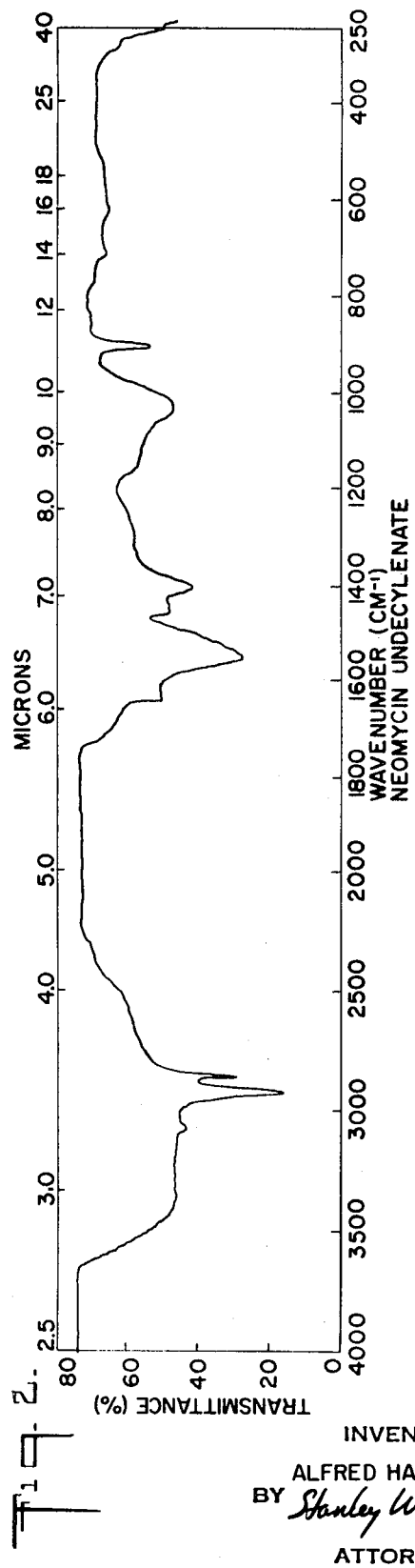
INVENTOR
ALFRED HALPERN
BY Stanley Wolder
ATTORNEY

3,607,864

PROCESS FOR PREPARING NEOMYCIN UNDECYLENATE

This invention relates to an improvement in the process for preparing neomycin undecylenate and in particular, describes the process for obtaining neomycin undecylenate in pure form by reacting an acid salt of neomycin with an alkali metal or an ammonium salt of undecylenic acid in an inert medium containing inorganic salt ions whereby said ions aid in the conglomeration of the formed neomycin undecylenate thereby facilitating its recovery in high yield.

Neomycin is an antibiotic substance well known in the art which is composed of several closely related entities which are termed neomycin A, neomycin B and neomycin C. Neomycin A, or neomine, is believed to be an inactive degradation product of neomycin B and its isomer neomycin C. Neomycin B, which has an empirical formula of $C_{23}H_{46}N_6O_{13}$, commonly constitutes about 90 percent of the commercial neomycin and has a higher antibiotic potency than neomycin C. The pharmaceutically available forms of neomycin are its acid salts of the mixture of neomycins in varying proportions. These are stable at room temperature over a wide range of pH values although the acid pH range is known to reduce the antibiotic potency through the hydrolysis of neomycin B and C to neomine. In pharmaceutical practice, the inorganic acid salts, as for example, neomycin sulfate is preferred when aqueous vehicles are used, whereas the higher fatty acid salts of neomycin are utilized with lipophilic carriers.

Acid salts of neomycin may be prepared through the reaction between the appropriate acid and the free base in either water or alcohol medium. An alternate procedure for the preparation of the long-chain fatty acid salts of neomycin is to react the sodium salt of the fatty acid with the inorganic acid salt of neomycin and isolating the formed higher fatty acid salt of neomycin. However, the latter process is generally considered to be unsatisfactory for the preparation of commercial batches. Thus van de Griendt states that the use of a mineral acid salt of neomycin with an alkali metal salt of the reactant fatty acid "is not completely satisfactory because of the fact that one of the reactants is a soap and the product is soaplike and, hence difficult to handle, isolate cleanly or purify. Drying may also be a problem. Inorganic salts, such as sodium sulfate, potassium chloride, and potassium sulfate are obtained as byproducts and may contaminate the product." (U.S. Pat. No. 3,022,286, Feb. 20, 1962, column 2, lines 35–41). This results in a costly and lengthy manufacturing process with generally poor yields.

When water is used as a solvent, the resulting higher fatty acid salts of neomycin are difficult to dry because of hydration and low melting points which generally results in a discolored product. Antioxidants have been suggested as a means for controlling this discoloration and this introduces a new contaminent into the resultant formed neomycin higher fatty acid salt. Furthermore, the formed byproduct metallic salts are difficult to remove, being entrapped in the waxlike neomycin higher fatty acid compound because there is no control over the particle formation and thereby lowers the antibiotic potency as well as to introduce still another byproduct contaminent. In addition, large quantities of wash water are required to remove these inorganic metal salt impurities and in the course of this lengthy and difficult washing process, degradation of the active neomycin moiety may occur to result in a further lowering of the overall antibiotic potency of the formed compound. The increased manipulative steps required to remove water-soluble byproduct contaminants together with inherent problems of drying the formed product, as well as the reduction in antibiotic potency are such as to generally make this process unsuitable and too costly for commercial manufacturing purposes.

The use of nonaqueous reaction media which have been proposed to correct these deficiencies presents new problems in that the inorganic acid salts of neomycin, as for example neomycin sulfate and neomycin chloride, are insoluble in alcohol and therefore, the use of an alcoholic medium limits the reagents to the free neomycin base and the desired fatty acid. Moreover, the use of alcohol as a commercial reaction solvent is too costly for routine manufacturing use and introduces special problems of vapor control to avoid fires and explosions which requires special equipment and handling techniques.

It was found that in the presence of inorganic salt ions in the aqueous reaction medium at a concentration level of not more than 10 percent of inorganic ions, as for example, alkali metal sulfates, and alkali metal chlorides, that the formed neomycin undecylenate is obtained in a virtually quantitative yield and possesses a higher antibiotic potency than the product obtained after the older methods. Moreover, since the newly formed neomycin undecylenate has not been excessively hydrated through lengthy washing procedures, it may be dried with relative ease and without discoloration, thus obviating the need for antioxidant substances, or the consequent loss in antibiotic potency. The new process is an especially convenient method for preparing neomycin undecylenate in large commercial quantities, because the reduced number of steps in its isolation, washing, purification and drying results in a product with a higher antibiotic potency obtained at a lowered unit cost.

In practice an aqueous solution of an alkali metal salt of undecylenic acid is prepared to a concentration of from 5 to 30 percent by weight of the alkali metal salt of undecylenic acid. It is generally preferred to utilize a solution with a range in concentration of the selected metal salt of undecylenic acid of from 10 percent to 20 percent by weight per unit volume and such solutions may be prepared by either the direct dissolution of the appropriate quantity of the alkali metal salt of undecylenic acid in the proper volume of water or by suspending the indicated amount of the free undecylenic acid in the aqueous solvent and then to form the salt, in situ, through the addition of the required quantity of an alkali metal oxide, hydroxide, carbonate or bicarbonate. The corresponding ammonium compound, as for example, ammonium hydroxide, ammonium carbonate, ammonium bicarbonate, and ammonia gas may also be used to form ammonium undecylenate, which is useful as a reagent to prepare neomycin undecylenate. A solution of the selected inorganic acid salt of neomycin, as for example, neomycin chloride or neomycin sulfate, prepared to contain a concentration of from 5 to 30 percent by weight of the selected neomycin acid salt per unit volume is then added to the solution of the alkaline salt of undecylenic acid. Additional water or inorganic ions may be added to adjust the salinity of the overall solution to be not greater than 10 percent and not less than 1 percent, with a preferred salinity concentration of about 5 percent. On standing at room temperature, the formed neomycin undecylenate conglomerates into an amorphous porous cake which may be readily separated from the reaction medium. The separated, formed, amorphous neomycin undecylenate is pulverized, washed with warm water and dried.

The neomycin undecylenate obtained is a white amorphous powder, soluble in methyl alcohol, ethyl alcohol and propylene glycol and virtually insoluble in glycerine and water. The pH of a solution containing 50 mg. per ml. of the newly formed neomycin undecylenate dissolved in 80 percent methyl alcohol is not less than pH 6.5 and not more than pH 7.0, has an average value of pH 6.82. A sample of the neomycin undecylenate manufactured by the present method, was subjected to analysis for the neomycin composition and was found to contain approximately 6 percent of neomycin C, the remainder being neomycin B, with traces of neomine. The effect of the presence of only a minimal quantity of neomycin C, which has a lesser antibiotic potency than neomycin B and the virtual elimination of neomine or neomycin A from the compound is reflected in the increased antibiotic potency determined for the newly formed neomycin undecylenate. Thus, the neomycin undecylenate obtained by the herein described process has an antibiotic potency when determined by the method described in 21 CFR 148 i.2, of about 500 mc.g./mg., which is twice the antibiotic potency of 250 mc.g./mg. reported for neomycin undecylenate prepared according to the older methods.

FIG. 1 describes the infrared spectrum of neomycin undecylenate obtained by the present method and FIG. 2 represents the infrared spectrum of a sample of commercially available neomycin undecylenate certified to meet the requirements for neomycin undecylenate provided in 21 CFR 148i.2.

The infrared spectra of both samples of neomycin were obtained in the following manner. Approximately 1 milligram of neomycin undecylenate was accurately weighed and thoroughly mixed with 200 milligrams of dried infrared spectrophotometric quality potassium bromide in a small ball mill for about 1 minute. A potassium bromide disc was prepared by transferring the uniform mixture to a die of suitable size. The die was evacuated gradually while raising the pressure to 3,000 pounds per square inch which was held at 3,000 pounds pressure per square inch until the evacuation was complete and then the pressure was increased to 20,000 pounds per square inch. This pressure was held for 2 or 3 minutes to form the pellet. The infrared spectrum of the respective samples was then obtained over the range of from 2 $\mu$ to 16 $\mu$ with a Perkin-Elmer Infra-red Spectrophotometer, model No. 457, and a characteristic peak absorption was observed at 7.1 $\mu$ and 11 $\mu$ for both compounds.

When carrying out the new process, any water-soluble acid salt of neomycin may be used, although neomycin chloride and neomycin sulfate are preferred salts. The water-soluble alkali metal salts of undecylenate acid are preferred reagents although the insoluble metal salts of undecylenic acid may be used but these latter compounds increase the time for reaction and generally present no advantages over the corresponding soluble salts. Thus, sodium, potassium, lithium and ammonium undecylenate are preferred reagents for the new process. Should these salts be not readily available commercially, then these may be prepared by the reaction between undecylenic acid and the selected metal oxide, hydroxide, carbonate or bicarbonate salt of the corresponding ammonium compound or ammonia gas. In practice, it is not necessary to isolate the formed metal salt of undecylenic acid and it may be utilized in the solvent wherein it has been prepared since inert or volatile byproducts which do not affect the consequent steps of the process are produced.

The order of mixing of the reagents is important in its effect upon the ultimate yield of desired compound as well as its antibiotic potency. Thus, it is known that neomycin salts generally are more stable in alkaline media than in acid media and, therefore, the order of mixing should be to add the solution of the neomycin acid salt to the solution of the alkali metal undecylenate salt in order that an alkali milieu be maintained during the mixing process. When all of the reagents have been added, the pH falls within the neutral to slightly alkaline range and the reaction rapidly proceeds to form the desired compound.

Generally, the temperature at which the new process is conducted is not critical, but the yield of the desired product will be somewhat higher when a cold temperature range of from room temperature to 50° C. is observed, than when elevated temperatures are utilized. However, excellent yields are obtained over the usual temperature range for manufacturing this product.

When the reaction has been completed, the salinity of the medium contributes to the conglomeration of the formed neomycin undecylenate to permit its separation from the solvent in a virtually quantitative manner. Filtration or centrifugation are preferred methods of separation although straining and decantation may also be used. The optimal salinity of the reaction medium for a given production batch will depend upon the concentration of reagents utilized and the size of the batch to be manufactured. A convenient guideline for the optimal range in salinity is the specific gravity of the aqueous solvent. The range in specific gravity for the aqueous solvent, after all of the ingredients have been added, should be between 1.0900 and 1.0090, with a preferred specific gravity to be about 1.0510, at 20° C.

In practice, it may be found necessary to adjust the salinity of the reaction medium to the desired level, in which case it may be lowered by the addition of distilled water, or it may be increased by the addition of salt ions. The particular salt to be used should be one which has ions in common with the metallic and acid salt-forming moieties. Thus, if neomycin sulfate and sodium undecylenate are the reagents selected, then the salinity may be adjusted by the addition of sodium sulfate to obtain the preferred specific gravity for the aqueous solvent.

An alternate procedure for adjusting the salinity of the solvent is to utilize only one common inorganic ion to those of the reagents present in the solution. Thus, either a solution of the neomycin acid salt, or a solution of the respective alkali metal salt of undecylenic acid may be added to increase the specific gravity of the solvent. The advantages in using the single common inorganic ion to adjust the specific gravity of the solvent are the more sensitive control of the changes in the specific gravity produced and the pH control afforded. Both the neomycin acid salts and the alkali metal undecylenate salts are weak salts, i.e., they are formed from either a weak base and a strong acid, or a strong base and a weak acid. Therefore, when the neomycin acid salt solution is utilized to adjust the specific gravity, it will confer a concomitant change in pH by increasing the acidity, while the opposite conditions would result after the addition of the metal or ammonium salt of undecylenic acid by increasing the alkalinity. The addition of the solution containing the single common inorganic ion to adjust the specific gravity will avoid precipitous changes in the specific gravity and thereby afford a better control of the salinity through the relatively small increases resulting. These minimal changes in specific gravity are most desirable when large manufacturing batches are being prepared and the specific gravity of the solution is about the optimal value. Under ordinary circumstances, the use of a predetermined ratio of weight of reagent to the volume of solvent to prepare the solution will result in the desired salinity and is a preferred method to achieve the optimal salinity conditions for the new process.

The formed neomycin undecylenate cake is porous and may be readily pulverized so that simple washing with either cold or warm water will remove contaminants to result in a product having a sufficient state of purity for further chemical or pharmaceutical processing into unit dosage form. Should it be desired to obtain a higher degree of purity, then the formed neomycin undecylenate cake may be dissolved in methyl or ethyl alcohol in a ratio of from 5 to 10 ml. of alcohol for each gram of neomycin undecylenate and the solution filtered. The neomycin undecylenate is precipitated by the addition of water and allowed to separate. Chilling may be utilized to effect a more complete separation and, after filtration and drying, the neomycin undecylenate obtained approximates chemical purity.

The following examples illustrate the scope of the present invention, but it is not intended to be limited by these:

EXAMPLE 1

To 15 liters of distilled water is added 3.424 kg. of sodium undecylenate and the mixture stirred to achieve solution. Gentle warming to achieve solution may be utilized, if necessary and then treated with charcoal, if required, and filtered. In another vessel is prepared a solution of 2.54 kgs. of neomycin sulfate dissolved in 10 liters of water. The solution of neomycin sulfate is slowly added to the solution of sodium undecylenate with stirring and when all of the solution of neomycin sulfate has been added, the specific gravity of the aqueous solvent is determined. If the specific gravity of the aqueous solvent is higher than 1.090, then it should be diluted with distilled water but if the specific gravity is less than 1.050, then it should be increased to about this value by the further addition of common ions as for example, sodium undecylenate or sodium sulfate. The stirring is continued until no more neomycin undecylenate separates from the clear solution. This will usually be accomplished within a period of from 5 to 10 minutes after all reagents are added. When the formation of neomycin undecylenate has been completed, it is separated from the reaction solvent either through filtration or centrifugation and the neomycin undecylenate cake suspended in an equal volume of water. The mixture is vigorously stirred, filtered and the excess solvent removed as much as is possible while on the filter, and the formed neomycin undecylenate dried and powdered.

The resultant product is a white amorphous powder, soluble methyl alcohol, ethyl alcohol, propyl alcohol, iso-propyl alcohol and propyline glycol, but insoluble in glycerine and water. The infrared spectrum of the formed neomycin undecylenate, utilizing potassium bromide pellets at a concentration level of 0.5 percent neomycin undecylenate shows an absorption maxima at 7.1 and 11 $\mu$ (see FIG. 1). The ultraviolet absorption spectrum determined for the prepared neomycin undecylenate, treated in the manner described in 21 CFR148i.1, indicated the compound to have absorption maxima at 232 $\mu$ and 278 $\mu$. The ratio of the two maximum absorbences is not less than 1.20 and not more than 1.50, in accordance with the description stated in the aforesaid 21 CFR 148i.1. The pH of a solution containing 50 mg. of neomycin undecylenate per ml. in 80 percent methyl alcohol is not less than pH 6.5 and not more than pH 7.0 and the moisture content of the dried powder is not more than 5 percent.

When subjected to biologic antibiotic potency assay by the method described in 21 CFR 148i.2, the newly formed neomycin undecylenate exhibits a potency of about 500 mc.g./mg. The antibacterial spectrum of the neomycin undecylenate, obtained by the above process, compares in every way with the neomycin undecylenate obtained by the older methods. When the newly formed neomycin undecylenate was analyzed for its neomycin composition, it was found to contain not more than 6 percent of neomycin C and only trace amounts of neomine.

EXAMPLE 2

In place of the neomycin sulfate described in example 1 above, there may be substituted an equivalent quantity of neomycin chloride, neomycin hydrochloride, neomycin bromide or neomycin nitrate. In place of the sodium undecylenate described in example 1 above, there may be substituted equimolar quantities of potassium undecylenate, lithium undecylenate, or ammonium undecylenate. The remainder of the steps being the same, the formed neomycin undecylenate compares in every respect to that described in example 1 above.

EXAMPLE 3

In place of the water utilized as the solvent in examples 1 and 2 above, there may be substituted a hydro-alcoholic solution consisting of at least 10 percent water and the remainder, methanol, ethanol, propanol or iso-propanol. Acetone may also be utilized to replace part of the aqueous solvent and for this purpose an acetone-water mixture containing at least 30 percent of water may be used but a mixture of equal parts acetone and water is preferred. The remainder of the steps being the same, the product obtained compares in every respect to the product described in example 1 above.

EXAMPLE 4

In a suitable vessel is prepared a solution containing 508 grams of neomycin sulfate dissolved in 10 liters of water. The solution is filtered, decolorized with charcoal, if necessary. In another vessel containing 10 liters of water is suspended 504.2 grams of undecylenic acid and to this is added 175.7 grams of potassium hydroxide and the mixture stirred until solution is complete. The solution of neomycin sulfate is then added to the solution of potassium undecylenate and the whole stirred. The specific gravity of the aqueous solvent is determined and adjusted with small increments of potassium undecylenate until the specific gravity is about 1.0500. The formed neomycin undecylenate is allowed to conglomerate and then separated from the solvent. The neomycin undecylenate is suspended in 10 liters of distilled water, vigorously agitated, filtered and dried. The resultant product compares in every way with that obtained by the process of example 1 above.

EXAMPLE 5

In place of the potassium hydroxide described in example 4, there may be substituted, in equimolar quantities sodium hydroxide, sodium carbonate, sodium bicarbonate, potassium carbonate, potassium bicarbonate, lithium hydroxide, lithium carbonate, lithium bicarbonate, ammonium carbonate, ammonium bicarbonate, ammonium hydroxide and ammonia. When ammonia is used in place of sodium hydroxide, then the gas is passed through an aqueous suspension of undecylenic acid until all of the undecylenic acid has dissolved. The mixture is then boiled to remove any excess ammonia and the solution of ammonium undecylenate utilized as described above. The remainder of the steps being the same, the product obtained possesses the properties described for neomycin undecylenate in example 1 above.

EXAMPLE 6

When it is desired to adjust the specific gravity of the aqueous solvent to be within the range of from 1.0900 to 1.0090, then any of the inorganic ions common to the selected reagents may be used in the form of a solution containing the same. In practice an ionizing salt containing these ions, as for example sodium sulfate, potassium sulfate, lithium sulfate, ammonium sulfate, sodium chloride, potassium chloride, lithium chloride, ammonium chloride, sodium undecylenate, potassium undecylenate, lithium undecylenate, ammonium undecylenate, neomycin chloride and neomycin sulfate is dissolved in sufficient water to prepare a 10 percent w/v solution of the respective salt. The aforesaid salt solution is used when the specific gravity is below the desired level in order to obtain an increase in specific gravity. The solvent utilized for the preparation of neomycin undecylenate, as for example, water, liquid alkanols of from 1 to 3 carbon atoms in chain length, acetone and mixtures of these may be utilized to lower the specific gravity. The adjusting solution is added in increments of about 100 ml. per 10 liters of manufacturing volume batch size, although greater or lesser volumes may be used, if desired. The specific gravity adjustment is best accomplished with the aid of a pycnometer to permit the rapid determination of specific gravity values. In practice it will ordinarily be found necessary to add at least one increment of the specific-gravity-adjusting fluid to obtain a preferred reaction medium specific gravity of about 1.0500.

EXAMPLE 7

In a suitable vessel containing 5 liters of methanol and 5 liters of distilled water is added 184.27 grams of undecylenic acid and 84 grams of sodium bicarbonate. The mixture is stirred until complete solution is achieved and the ebullition of carbon dioxide cases and the solution filtered. If the solution is cloudy after stirring for a reasonable period of time, an additional 5 grams of sodium bicarbonate may be added to clarify the solution. To the filtered solution is then added 652.7 grams of neomycin hydrochloride and the mixture stirred. The specific gravity of the solvent is determined and adjusted with 10 percent sodium chloride solution to bring the salinity of the solvent as reflected in the specific gravity within the range of specific gravity, of from 1.050 to 1.075. The mixture is stirred until no further neomycin undecylenate separates from the solution and an additional 5 liters of methanol is added, stirred and set aside to conglomerate the neomycin undecylenate. The neomycin undecylenate is separated and set aside. The filtrate is now diluted with three volumes of distilled water and chilled. After a suitable interval, the separated neomycin undecylenate is again filtered and the two lots of neomycin undecylenate are mixed, suspended in distilled water, warmed to about 50° C. and then allowed to cool to room temperature, while stirring. The suspension is then filtered and the neomycin undecylenate dried. The formed neomycin undecylenate thus obtained compares in every respect to that obtained as a result of example 1 above.

EXAMPLE 8

To a solution of 1.8 kilograms of undecylenic acid, dissolved in 3 liters of acetone, is added 2 liters of water. The mixture is stirred and ammonia gas bubbling through the mixture until an increase in weight of 200 grams is achieved. The mixture is then heated on a water bath to remove 500 cc. of acetone by distillation. To the remaining solution, after cooling to room temperature, is added 1.4 kilograms of neomycin sulfate and the mixture stirred. The specific gravity of the solvent is adjusted through the addition of distilled water until it reaches a specific gravity of 1.0090. The separated neomycin undecylenate is allowed to conglomerate, separated from the solvent, dried and powdered. The powdered neomycin undecylenate is dissolved in 10 volumes of ethanol to which is added sufficient water to bring the solution to the cloud point. The mixture is set aside to chill and the formed neomycin undecylenate collected by filtration. To the filtrate is added additional distilled water to again bring the solution to a could point and a second crop of neomycin undecylenate is obtained. The two lots of neomycin undecylenate are mixed, dried and powdered and it compares in every respect to that obtained with the product described as a result of example 1 above.

EXAMPLE 9

To 15 liters of distilled water is added sequentially 1.7 kgs. ammonium undecylenate and 1.27 kgs. neomycin hydrochloride. The mixture is stirred and the specific gravity of the solvent adjusted to be between 1.040 and 1.060, utilizing ammonium sulfate as the adjusting salt. The ammonium sulfate adjusting salt may be added in increments of 10 grams directly to the solvent. The formed neomycin undecylenate is allowed to separate and conglomerate into a mass which is then removed from the solvent. The cake of neomycin undecylenate is pulverized, washed with water, and dried. The neomycin undecylenate obtained in this manner compares in every respect to that obtained as a result of example 1 above.

EXAMPLE 10

Although the order of mixing of reagents set forth in examples 1 through 9 above describes a preferred sequence of the addition of reagents in that the acid solution is added to the alkaline solution, the reverse order of mixing, i.e., adding the alkaline solution to the acid solution, may also be used when practicing the new methods described herein. However, when the alkaline solution is added to the acid solution, the yield of final product is somewhat lower than that obtained in the described sequence of the examples 1 through 9. Thus, the average yield of neomycin undecylenate, after examples 1 through 9, will be at least 81 percent of the desired product, based upon the neomycin content of the reagent neomycin acid salt used but when the reverse sequence of adding reagents is utilized, the average yield of product is at least 73 percent, although higher yields will be obtained if particular care is taken in avoiding prolonged exposure n acid pH ranges.

This is usually achieved through the utilization of vigorous stirring and the rapid introduction of the alkaline salt of undecylenic acid.

While separately prepared solutions of the reagent are preferred, the direct addition of powders of the respective reagents to the solvent may also be utilized in the above process without significantly affecting the yield of the final product. The advantage of a solution of each separate reagent is the ease with which laboratory chemical control of concentration may be achieved so that the exact concentration of active substances is always available through chemical control testing. When the reagents are added directly in a sequential manner, the analytic methods require special techniques to avoid interference of the respective separated ions. However, such techniques and procedures are generally well known to those versed in the art.

What is claimed is:

1. The process for preparing neomycin undecylenate comprising the steps of
   a. adding a metallic salt of undecylenic acid selected from the group consisting of sodium undecylenate, potassium undecylenate, lithium undecylenate, ammonium undecylenate, calcium undecylenate, magnesium undecylenate, barium undecylenate, zinc undecylenate, copper undecylenate, and mixtures of the same, to an inert solvent selected from the group consisting of water, liquid alkanols of from 1 through 3 carbon atoms in chain length, acetone and mixtures of the same, said metallic salt of undecylenic acid being an ionizable salt;
   b. adding a neomycin acid salt selected from the group consisting of neomycin hydrochloride, neomycin chloride, neomycin sulfate, neomycin nitrate, and mixtures of the same;
   c. adjusting the specific gravity of the solvent to not less than 1.0090 and not more than 1.0900 with an adjusting agent selected from the group consisting of water, liquid alkanols of from 1 through 3 carbon atoms in chain length, acetone, an ion common to at least one of the reactants, and mixtures of the same;
   d. recovering the formed neomycin undecylenate.

2. The process of claim 1, wherein the concentration of said metallic salt of undecylenic acid being at least 1 gram molecular equivalent of the concentration of said neomycin acid salt.

3. The process of claim 1, wherein step "c," the adjusting of the specific gravity of the solvent, comprises adding a sufficient quantity of a salt selected from the group consisting of sodium sulfate, potassium sulfate, lithium sulfate, ammonium sulfate, sodium chloride, potassium chloride, lithium chloride, ammonium chloride, sodium undecylenate, potassium undecylenate, lithium undecylenate, ammonium undecylenate, and mixtures of the same.

4. The process of claim 1, wherein the step of adjusting the specific gravity of the solvent comprises adding a salt selected from the group consisting of neomycin chloride, neomycin sulfate, neomycin hydrochloride, neomycin nitrate, and mixtures of the same.

5. The process of claim 1, in which said metallic salt of undecylenic acid is added in sufficient quantity to yield a concentration of not more than 10 percent of metallic ions.

6. The process of claim 1, wherein said acid salt of neomycin is added in sufficient quantity to yield a concentration of not more than 10 percent of acid ions.

UNITED STATES PATENT OFFICE
CERTIFICATE OF CORRECTION

Patent No. 3,607,864        Dated September 21, 1971

Inventor(s)     ALFRED HALPERN

It is certified that error appears in the above-identified patent and that said Letters Patent are hereby corrected as shown below:

-- Assignee:    Synergistics
                      Yonkers, New York   10701

Signed and sealed this 3rd day of October 1972.

(SEAL)
Attest:

EDWARD M. FLETCHER, JR.                 ROBERT GOTTSCHALK
Attesting Officer                         Commissioner of Patents